(12) United States Patent
Kim et al.

(10) Patent No.: US 7,671,121 B2
(45) Date of Patent: Mar. 2, 2010

(54) THERMALLY CURABLE RESIN COMPOSITION WITH EXTENDED STORAGE STABILITY AND GOOD ADHESIVE PROPERTY

(75) Inventors: Dong Seok Kim, Daejeon Metropolitan (KR); Seung Hee Lee, Seoul (KR); Sang Kyu Kwak, Daejeon Metropolitan (KR); Yong Sik Ahn, Seoul (KR)

(73) Assignee: LG Chem. Ltd., Seoul (KR)

(*) Notice: Subject to any disclaimer, the term of this patent is extended or adjusted under 35 U.S.C. 154(b) by 1048 days.

(21) Appl. No.: 11/336,930

(22) Filed: Jan. 23, 2006

(65) Prior Publication Data

US 2006/0194906 A1    Aug. 31, 2006

(30) Foreign Application Priority Data

Jan. 25, 2005    (KR)    ............ 10-2005-0006528

(51) Int. Cl.
*C08K 5/24* (2006.01)
(52) U.S. Cl. ............ 524/261; 526/319; 526/335; 526/346; 526/279; 526/266
(58) Field of Classification Search ............ 524/261; 526/319, 335, 346, 279, 266
See application file for complete search history.

(56) References Cited

U.S. PATENT DOCUMENTS

2003/0032728 A1* 2/2003 Arhart et al. ............ 525/100
2006/0264593 A1* 11/2006 Nagoh et al. ............ 526/319

FOREIGN PATENT DOCUMENTS

| JP | 05-017711 | 1/1993 |
|---|---|---|
| JP | 05-257284 | 10/1993 |
| JP | 10-330689 | 12/1998 |
| JP | 2000-239497 | 9/2000 |
| JP | 2001-022075 | 1/2001 |
| JP | 2001-064337 | 3/2001 |
| JP | 2001-325045 | 11/2001 |
| JP | 2004-168953 | 6/2004 |
| KR | 10-2001-0018075 A | 3/2001 |
| KR | 10-2001-0049485 A | 6/2001 |

* cited by examiner

*Primary Examiner*—Robert D. Harlan
(74) *Attorney, Agent, or Firm*—McKenna Long & Aldridge LLP

(57) ABSTRACT

This invention provides a thermally curable resin copolymer (A), composed mainly of an ethylenically unsaturated monomer (a-1), which produces an acid via decomposition at 150° C. or more, an ethylenically unsaturated monomer (a-2) containing an epoxy group copolymerizable with the ethylenically unsaturated monomer (a-1), and an ethylenically unsaturated monomer (a-3) having a reactive silyl group; a thermally curable resin composition including the thermally curable resin copolymer; a cured film formed from the composition; and a liquid crystal display including the cured film. The thermally curable resin composition has extended storage stability and can be formed into the cured film having good adhesion to a substrate.

18 Claims, 3 Drawing Sheets

[Figure 1]
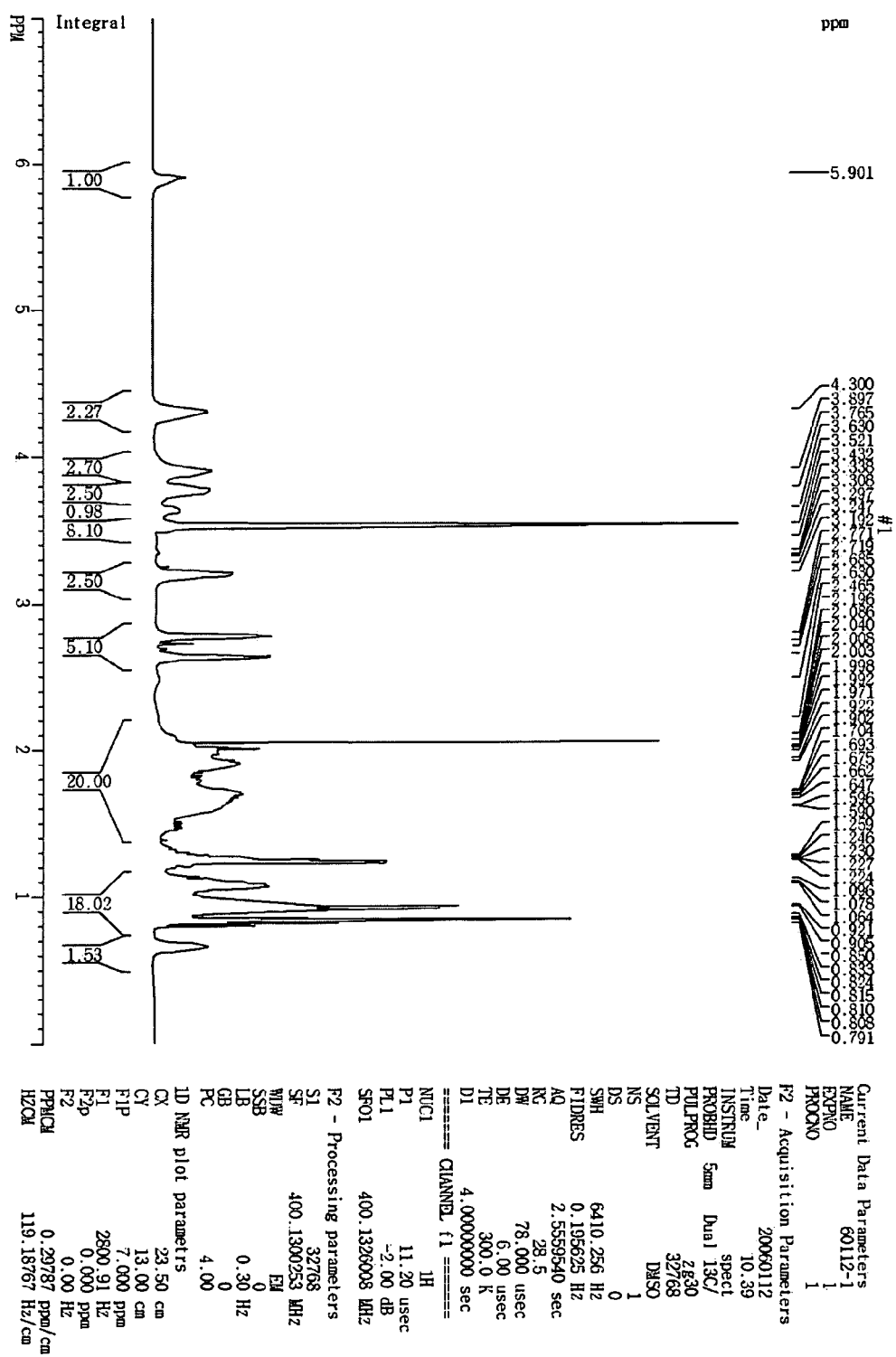

【Figure 2】
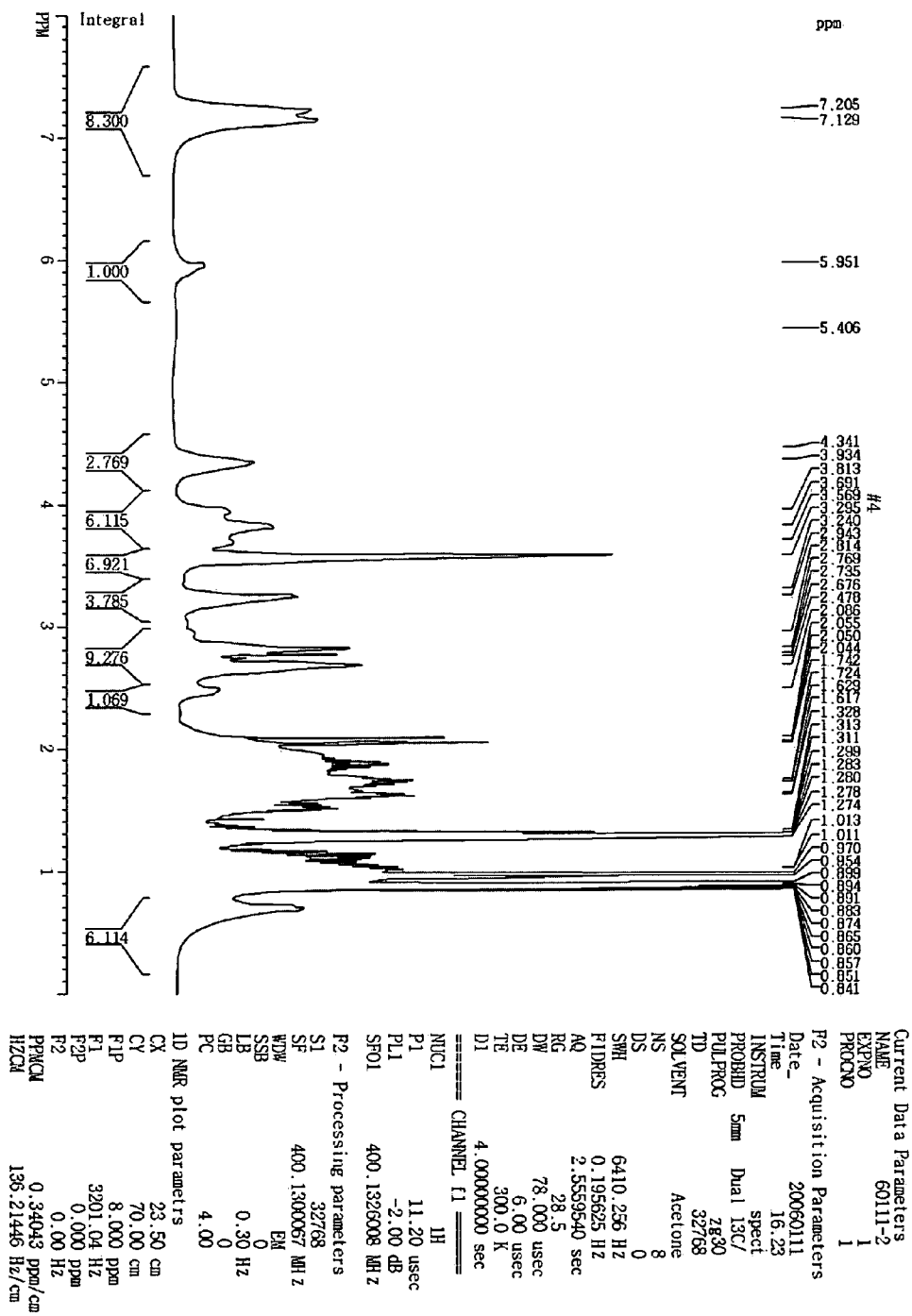

[Figure 3]
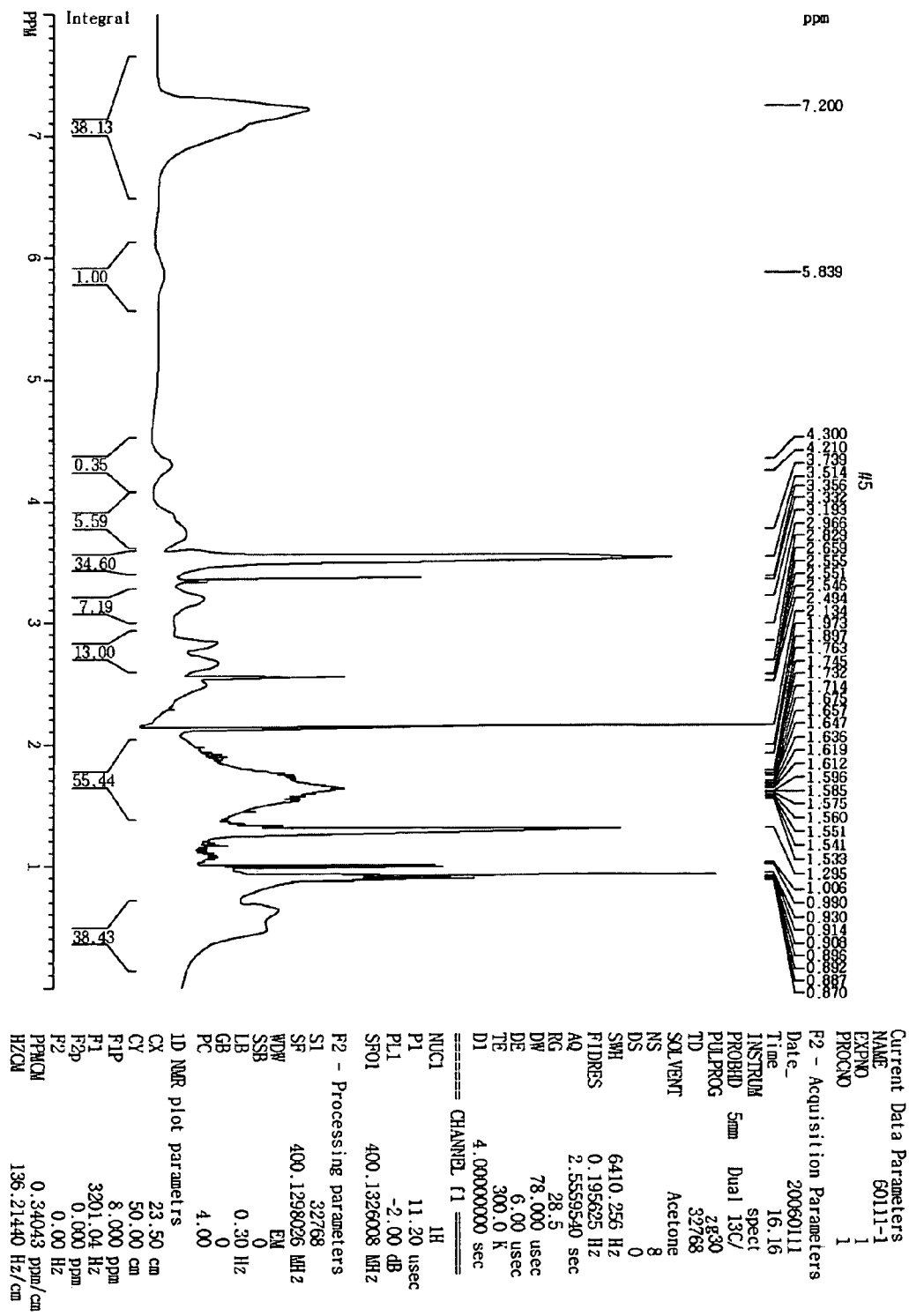

THERMALLY CURABLE RESIN COMPOSITION WITH EXTENDED STORAGE STABILITY AND GOOD ADHESIVE PROPERTY

TECHNICAL FIELD

The present invention relates to a thermally curable resin composition for use in a protective film of a color filter for a liquid crystal display (LCD). More specifically, the present invention relates to a thermally curable resin composition having extended storage stability and being able to form a cured film, good adhesion to a substrate, high surface hardness, and excellent heat resistance and chemical resistance, including acid resistance and alkali resistance, a cured film formed using the composition, and an LCD including such a film. This application claims the benefit of the filing date of Korean Patent Application No. 10-2005-0006528, filed on Jan. 25, 2005, in the Korean Intellectual Property Office, the disclosure of which is incorporated herein in its entirety by reference.

BACKGROUND ART

Generally, a color liquid crystal display device is treated with a solvent, an acid solution, or an alkali solution during preparation processes thereof, or the surface of the device is partially treated at a high temperature upon formation of a transparent electrode layer through a sputtering process. Occasionally, when the transparent electrode layer is etched to a desired shape, the above device is exposed to an acid solution or an alkali solution under severe conditions. In order to prevent damage to pixels due to heat or chemical material upon such treatment, a protective film, which consists of a thin film resistant to the above treatment, is provided. Further, a display device, such as an in-plane switching (IPS) mode LCD, requires a protective film, having no variation in thickness, to form a uniform liquid crystal layer, and excellent flatness, for maintaining the gaps of cells.

In addition, the protective film should have excellent adhesion to a substrate on which the protective film will be formed and to a layer that will be formed on the protective film, and as well, should have high transparency, heat resistance and light resistance. Moreover, the protective film should be resistant to deterioration, such as coloration or discoloration, for a long period of time, and should exhibit resistance to various chemicals, for example, acids, alkalis and organic solvents. Material for the protective film having such properties is classified into a photocurable material and a thermally curable material, depending on the methods of forming such a film. Known photocurable material is a negative-type photoresist material, disclosed in Korean Patent Laid-open Publication No. 2001-018075 and Japanese Patent Laid-open Publication No. 2001-064337. Known thermally curable material is an epoxy-based thermally curable resin composition, disclosed in Korean Patent Laid-open Publication No. 2001-049485 and Japanese Patent Laid-open Publication No. 2000-239497.

The process of forming the protective film using the photocurable resin composition is as follows. That is, a photocurable resin composition, which is to be processed into a protective film, is applied onto a substrate via an appropriate process, for example, a spin-coating process, prebaked, exposed, developed, and then postbaked, thus, forming a desired film.

On the other hand, since the thermally curable resin composition does not require exposure and development, comprised in the process of forming the film using the photocurable material, neither additional apparatus expense nor a space, such as a clean room are needed for exposure and development. However, the thermally curable resin composition, comprising typically of an epoxy resin and carboxylic acid or carboxylic acid anhydride, causes problems as mentioned in Japanese Patent Laid-open Publication No. 2001-325045, in particular, poor storage stability of the composition due to continuous reaction between the epoxy resin and carboxylic acid or carboxylic acid anhydride serving as a curing agent, and rapid curing of the composition due to the presence of carboxylic acid anhydride. Thus, the thermally curable resin composition has been used in a manner such that the epoxy resin is mixed with the curing agent immediately before use. Recently, although one-part curable resin composition, having reduced reactivity of a curing agent to alleviate the problem of storage stability, has been proposed, it does not sufficiently exhibit satisfactory storage stability. That is, even in the case where the problem of storage stability is alleviated, the reaction between the curing agent such as acid or acid anhydride and the epoxy group occurs continuously as long as each component remains. In practice, a curing process is undesirably caused before a postbaking process, thus decreasing the storage stability of the thermally curable resin composition.

Further, in such a conventional thermally curable resin composition, when the composition ratio of a monomer having an acid group and a monomer having an epoxy group is not controlled in a predetermined range, a cross-linking reaction between the monomers in the copolymer occurs continuously, leading to reduced storage stability of the composition. Continuously, limitations are imposed on synthesis of the copolymer.

Unlike the protective film remaining on the substrate in pattern form through selective exposure and development by use of the photocurable resin composition, the thermally curable resin composition is formed into a film on the whole surface of the substrate without a pattern, and thus, requires higher adhesion to each of the substrate and the layer formed on the protective film than the photocurable resin composition. Specifically, if adhesion is insufficient between the protective film and the color filter layer and between the protective film and the glass substrate, a sealing therebetween may be broken upon injection of a liquid crystal material. Also, upon deposition of ITO, a peeling phenomenon may be caused between the ITO/protective film or protective film/color filter layer. In addition, various thermally curable resin compositions, each having an epoxy resin and a curing agent such as carboxylic acid or carboxylic acid anhydride, suffer because they have poor storage stability, and as well, it is difficult for them to simultaneously assure diverse required properties and adhesion.

In the conventional techniques, although an adhesion adjuvant such as a silane compound may be used to ensure adhesion, it is disadvantageous because the thermally curable resin composition becomes unstable due to the addition of the low-molecular weight component and also various impurities may be generated on pipes upon the process, thus the amount of such an adjuvant is limited.

DISCLOSURE

Technical Problem

Accordingly, the present invention has been made keeping in mind the above problems occurring in the prior art, and an object of the present invention is to provide a thermally curable resin copolymer which has greatly improved storage stability while it is able to form a cured film having high adhesion to a substrate. The other objects of the present invention are to provide a thermally curable resin composition having the above copolymer, a cured film formed using the composition, and an LCD including such a cured film.

Technical Solution

The present invention provides a thermally curable resin copolymer (A), composed mainly of an ethylenically unsaturated monomer (a-1), which produces an acid via decomposition at 150° C. or more, an ethylenically unsaturated monomer (a-2) containing an epoxy group copolymerizable with the ethylenically unsaturated monomer (a-1), and a polymerizable monomer (a-3) having a reactive silyl group; a thermally curable resin composition including the above copolymer; a cured film formed using the above composition; and an LCD including the cured film.

DESCRIPTION OF DRAWINGS

FIGS. 1 to 3 show NMR data of copolymers prepared in Examples 1, 4 and 5 of the present invention.

MODE FOR INVENTION

Hereinafter, a detailed description will be given of the present invention.

The formation of a film using a thermally curable resin composition is conducted in a manner such that the above composition is applied onto a substrate on which the above film will be formed, prebaked at 60~130° C., and then postbaked at 150° C. or more, preferably 150~250° C.

The present invention is characterized in that a monomer (a-1) capable of producing an acid through decomposition in a specific temperature range, preferably in a temperature range required for the postbaking process, is used as the component of a thermally curable resin copolymer, instead of using a curing agent, such as an acid or acid anhydride, as an essential component of a conventional thermally curable resin composition. As such, the monomer (a-1) itself is not an acid or acid anhydride. In the present invention, such a monomer (a-1) is referred to as a 'latent curing agent'. Also, the present invention is characterized by further comprising an ethylenically unsaturated monomer (a-3) having a reactive silyl group, in addition to the monomer (a-1).

The above characteristics are specifically explained as follows.

First, since the latent curing agent used in the present invention produces an acid through thermal decomposition at 150° C. or more, it is stably present up to the prebaking process. When the latent curing agent is thermally decomposed upon a postbaking process at 150° C. or more, an acid is generated, thus curing the epoxy group. In this way, thanks to the characteristic of the latent curing agent, the thermally curable resin composition of the present invention has extended storage stability.

Second, the reactive group of the ethylenically unsaturated monomer (a-3) having a reactive silyl group, for example, an alkoxy group, is chemically bonded with the substrate through the reaction with the substrate following polycondensation with the acid produced by the latent curing agent (a-1) upon postbaking. Hence, the cured film obtained using the thermally curable resin composition of the present invention has very high adhesion to the substrate. The ethylenically unsaturated monomer (a-3) having a reactive silyl group is difficult to use to form a polymer along with an acid or acid anhydride, serving as a main component of a conventional thermally curable resin composition, because of the polycondensation with the acid mentioned above.

Third, a conventional thermally curable resin composition has been limited in the composition ratio of monomers constituting the copolymer due to the problem of storage stability. Particularly, since a gelling phenomenon has already occurred during the polymerization of the copolymer depending on the composition ratio of monomers, the copolymer cannot but form at a remarkably limited composition ratio so as not to generate such gelling. Moreover, the partial reaction between the acid and alkoxy group is conducted during the polymerization of the copolymer even at the limited composition ratio, and the thermally curable resin composition prepared using such a copolymer thus has poor storage stability. However, in the present invention, the acid or acid anhydride is not used as the component of the copolymer, and the monomer (a-1), functioning as the latent curing agent stable at a polymerization temperature, is used, thereby widely and variously controlling the composition ratio of monomers without limitation. Further, the storage stability of the thermally curable resin composition thus prepared is extended.

Fourth, a conventional thermally curable resin composition suffers because limitations are imposed on the composition ratio of monomers constituting the copolymer due to the problem of storage stability, and, in order to alleviate such a limitation, an additive such as a polyfunctional monomer or an epoxy resin is used, hence realizing the properties of the protective film. However, in the present invention, thanks to the stability of the monomer functioning as the latent curing agent, the composition ratio of monomers can be variously controlled. Thus, it is possible to realize the properties required for the protective film by using only the thermally curable resin copolymer. That is, the required properties of the protective film can be provided even without the use of an additional additive.

Fifth, since acid anhydride, used as a curing agent for a conventional thermally curable resin composition, is unstable, an epoxy resin and a curing agent are separately stored and then mixed immediately before use. In such a case, however, a problem of clogging due to the poor workability upon mixing process may occur. In contrast, the thermally curable resin composition of the present invention may be used in the form of one-part solution, and thus productivity is increased because there is no need for an additional mixing process.

Sixth, the thermally curable resin composition of the present invention is not cured upon prebaking but is cured upon postbaking. In the case where the above composition is undesirably applied, the substrate coated with the composition, for example, a glass substrate, may be readily recycled at low expense.

The above-mentioned effects can be confirmed through the examples as described below.

<Thermally Curable Resin Composition>

A thermally curable composition according to the present invention is characterized by including a copolymer (A) composed mainly of monomers [(a-1), (a-2) and (a-3)] described below, as a thermally curable copolymer.

As the monomer (a-1), any monomer may be used as long as it is able to produce an acid through the decomposition at a postbaking temperature for formation of a cured film, that is, 150° C. or more, preferably 150~250° C. In particular, preferable is a monomer containing a 2-tetrahydropyranyl group represented by Formula 1 below:

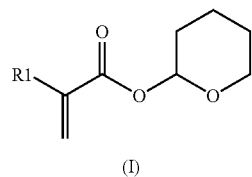

Formula 1

(I)

wherein R1 is a hydrogen atom or an alkyl group having 1 to 6 carbons.

As such, the alkyl group may be either linear or branched, and is specifically exemplified by a methyl group, an ethyl group, a propyl group, an isopropyl group, an n-butyl group, an iso-butyl group, a sec-butyl group, an n-pentyl group, etc.

The monomer containing a 2-tetrahydropyranyl group represented by Formula 1 functions to cure an epoxy group via decomposition into dihydropyran and methacrylic acid at 150° C. or more. Such a monomer containing a 2-tetrahydropyranyl group is preferably 2-tetrahydropyranyl methacrylate or 2-tetrahydropyranyl acrylate.

The monomer (a-1) for producing an acid reactable with an epoxy group at 150° C. or more is used in an amount of 5~50 parts by weight, preferably 10~40 parts by weight, based on 100 parts by weight of the thermally curable resin copolymer (A). If the amount of monomer (a-1) is less than 5 parts by weight, the curing process occurs insufficiently. On the other hand, if the above amount exceeds 50 parts by weight, a thickness of the postbaked film is considerably reduced, compared to a thickness of the prebaked film, and thus flatness is difficult to maintain, and as well, adhesion is decreased.

As the monomer (a-2), an ethylenically unsaturated monomer containing an epoxy group reactable with the monomer (a-1) may be used. In particular, any compound may be used without limitation as long as it has both a radical polymerizable ethylenically unsaturated bond and an epoxy group in the molecule thereof. However, since a protective film of a color filter for an LCD requires excellent transparency, a colorless compound is preferably used. Examples of the epoxy group-containing monomer (a-2) include, but are not limited to, aliphatic epoxy-containing unsaturated compounds, such as allylglycidylether, glycidyl 5-norbornene-2-methyl-2-carboxylate (mixture of endo and exo), 1,2-epoxy-5-hexene, 1,2-epoxy-9-decene, 3,4-glycidyl(meth)acrylate, glycidyl α-ethyl(meth)acrylate, glycidyl α-n-propyl(meth)acrylate, glycidyl α-n-butyl(meth)acrylate, 3,4-epoxybutyl(meth)acrylate, 4,5-epoxypentyl(meth)acrylate, 5,6-epoxyheptyl(meth)acrylate, 6,7-epoxyheptyl α-ethylacrylate, methylglycidyl(meth)acrylate, etc.; alicyclic epoxy-containing unsaturated compounds represented by Formulas 2 to 4 below; or mixtures thereof. Particularly, glycidyl(meth)acrylate or 3,4-epoxycyclohexyl(meth)acrylate is preferable. In addition, aromatic epoxy-containing unsaturated compounds may be used within a range that does not retard transparency.

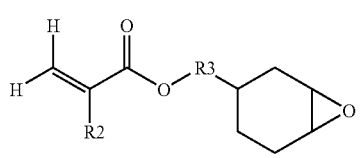

Formula 2

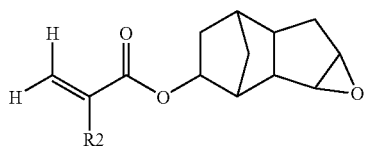

Formula 3

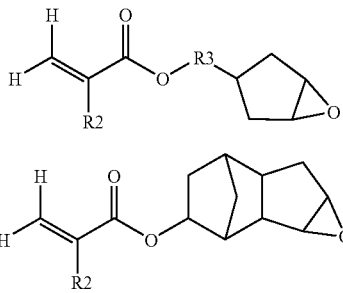

Formula 4 in Formulas 2 to 4, R2 is a hydrogen atom or an alkyl group having 1 to 6 carbons, and R3 is an alkylene group having 0 to 6 carbons.

As such, the alkyl group may be either linear or branched and is specifically exemplified by a methyl group, an ethyl group, a propyl group, an isopropyl group, an n-butyl group, an iso-butyl group, a sec-butyl group or an n-pentyl group.

The alkylene group may be either linear or branched and is specifically exemplified by a methylene group, an ethylene group, a propylene group, an isopropylene group, an n-butylene group, an iso-butylene group, a sec-butylene group, an n-pentylene group, etc.

The epoxy group-containing ethylenically unsaturated monomer (a-2) is used in an amount of 10~90 parts by weight, and preferably 20~70 parts by weight, based on 100 parts by weight of the thermally curable resin copolymer (A). If the amount of monomer (a-2) is less than 10 parts by weight, the cured film has poor mechanical strength, chemical resistance and heat resistance, attributed to insufficient curing. On the other hand, if the above amount exceeds 90 parts by weight, the amount of monomer (a-1) is relatively decreased and the curing process takes place insufficiently.

The ethylenically unsaturated monomer (a-3) having a reactive silyl group is preferably an ethylenically unsaturated compound containing at least one reactive silicon in the molecule thereof. Examples thereof include vinyltrialkoxysilane, such as vinyltrimethoxysilane, vinyltriethoxysilane, etc.; vinyltris(β-methoxyethoxy)silane; methylvinyldimethoxysilane; and (meth)acryloxysilane, such as β-(meth)acryloxyethyltrimethoxysilane, β-(meth)acryloxyethyltriethoxysilane, γ-(meth)acryloxypropyltrimethoxysilane, γ-(meth)acryloxypropyltriethoxysilane, γ-(meth)acryloxypropylmethyl dimethoxysilane, γ-(meth)acryloxypropyldimethylmethoxysilane, γ-(meth)acryloxypropylmethyldiethoxysilane, γ-(meth)acryloxypropyldimethyl ethoxysilane, etc. Of the listed compounds, (meth)acryloxyalkyltrialkoxysilane is preferable, in terms of high reactivity of reactive silyl group and good stability, and γ-(meth)acryloxypropyltrimethoxysilane is further preferable. As a commercially available silicon-based (meth)acrylate monomer, there are KBM-503 and KBM-5103, available from ShinEtsu Chemical Co. Ltd. The monomer (a-3) is used in an amount of 5~60 parts by weight, and preferably 10~50 parts by weight, based on 100 parts by weight of the thermally curable resin copolymer (A). If the amount of monomer (a-3) is less than 5 parts by weight, adhesion to a substrate is insufficient. On the other hand, if the above amount exceeds 60 parts by weight, the mechanical strength of the cured film may be reduced.

The thermally curable resin copolymer (A) comprising the above-mentioned monomers (a-1), (a-2) and (a-3) may further comprise a polymerizable monomer (a-4), if necessary.

Examples of the polymerizable monomer (a-4) include, but are not limited to, aliphatic or aromatic (meth)acrylate, such as benzyl(meth)acrylate, phenyl(meth)acrylate, cyclohexyl (meth)acrylate, methyl(meth)acrylate, ethyl(meth)acrylate, n-butyl(meth)acrylate, t-butyl(meth)acrylate, 2-ethylhexyl (meth)acrylate, etc.; caprolactone modified (meth)acrylate, such as TONE M-100, TONE M-101, TONE M-201 (available from DOW Chemical Co.), FM-1, FM-2, FM-3 (available from Daicel UCB Co. Ltd.), etc.; an acrylate monomer having a hydroxyl group, such as 2-hydroxyethyl(meth)acrylate or M-20G, M-40G, M-90G (available from Shin-Nakamura Co. Ltd.); a styrene monomer, such as styrene, 4-methoxystyrene, 4-methylstyrene, etc.; 1,3-butadiene; isoprene, etc.

The polymerizable monomer (a-4) may be variously used in order to appropriately control the properties of the cured film obtained using the thermally curable resin composition, for example, mechanical strength, adhesion, flatness, etc. The above monomer is preferably used in an amount of 1~50 parts by weight, based on 100 parts by weight of the thermally curable resin copolymer (A).

The thermally curable resin copolymer (A) obtained using the monomers (a-1), (a-2) and (a-3) as the main components may be easily thermally cured, even without the use of a specific curing agent, by virtue of the activation of a chemically blocked carboxyl group upon heat-curing, and has excellent storage stability even in the presence of a reactive silyl group.

The thermally curable resin copolymer (A) composed of the above-mentioned components may be prepared using any one process known in the art, including solution polymerization, emulsion polymerization, etc., and may be used in the form of a random copolymer or block copolymer.

The molecular weight of the copolymer (A) thus prepared is not particularly limited as long as a flat film may be realized, and may be appropriately selected depending on the film thickness, applicators, film formation conditions, end uses, etc. Typically, the copolymer (A) has a weight average molecular weight (Mw) ranging from 2,000 to 100,000, and preferably from 3,000 to 50,000, calculated using polystyrene as a standard. If the molecular weight is less than 2,000, the film formation performance of the thermally curable resin composition is decreased. On the other hand, if the molecular weight exceeds 100,000, it is difficult to handle the copolymer, and flatness is decreased.

The thermally curable resin composition according to the present invention may further include a solvent (B). The solvent (B) is not particularly limited as long as it uniformly dissolves the components and has no reactivity with the components of the composition due to chemical stability thereof.

Examples of the solvent (B) include, but are not limited to, alkylketones, such as methylethylketone or cyclohexanone; ethers, such as tetrahydrofuran; ethyleneglycol alkylether acetates, such as methylcellosolve acetate, ethylcellosolve acetate or ethyleneglycol butylether acetate; propyleneglycol alkylether acetates, such as propyleneglycol methylether acetate, propyleneglycol ethylether acetate or propyleneglycol propylether acetate; ethyleneglycols, such as butylcellosolve, 2-methoxyethyl ether, ethyleneglycol ethylmethylether or ethyleneglycol diethylether; esters, such as ethyl acetate, ethyl lactate or ethyl 3-ethoxypropionate; or mixtures thereof.

In addition to the copolymer (A) and solvent (B) included in the thermally curable resin composition of the present invention, as additives necessary for other end uses, such as film formation performance, adhesion to a substrate, and chemical stability, a polyfunctional monomer (C), an adhesion adjuvant (D), and an additive (E), such as a surfactant or a thermal polymerization preventing agent, may be used within a range that does not retard flatness, transparency or heat resistance.

As the polyfunctional monomer (C) having ethylenically unsaturated bonds, a compound having 2 to 6 unsaturated functional groups is preferable. This is because each functional group connected to a central point of the molecule crosslinks with another polyfunctional monomer to form a network structure, thereby increasing the strength and chemical resistance of the cured film. Examples of the polyfunctional monomer (C) having ethylenically unsaturated bonds include, but are not limited to, polyfunctional (meth)acrylates, such as ethyleneglycol di(meth)acrylate, propyleneglycol di(meth)acrylate, 1,3-butanediol di(meth)acrylate, neopentylglycol di(meth)acrylate, 1,6-hexanediol di(meth)acrylate, trimethylolpropane tri(meth)acrylate, pentaerythritol di(meth)acrylate, pentaerythritol tri(meth)acrylate, pentaerythritol tetra(meth)acrylate, dipentaerythritol penta(meth)acrylate, dipentaerythritol hexa(meth)acrylate, etc. As such, the selected compound may be used alone or in combinations thereof. In particular, dipentaerythritol pentaacrylate or dipentaerythritol hexaacrylate is preferable.

The polyfunctional monomer (C) having ethylenically unsaturated bonds is used in an amount of 1~200 parts by weight, and preferably 5100 parts by weight, based on 100 parts by weight of the thermally curable resin copolymer (A) of the present invention. Since the polyfunctional monomer (C), which is a crosslinkable compound, has a molecular weight lower than the copolymer (A) of the present invention, it is effective for improvement of flatness. In the case where this monomer is used in the above composition range, film formability is high and the problem of tacky film does not occur.

The adhesion adjuvant (D) is a compound functioning to reinforce adhesion to a substrate, and is not particularly limited as long as it satisfies the above purpose. As the adhesion adjuvant (D), a silane compound may be used. Examples of the silane compound include, but are not limited to, methacryloxypropyl trimethoxysilane, γ-glycidoxypropyl trimethoxysilane, β-(3,4-epoxycyclohexyl)ethyl trimethoxysilane, γ-mercaptopropyl trimethoxysilane, vinyltriacetoxysilane, vinyltrimethoxysilane, or mixtures thereof. The adhesion adjuvant (D) is used in an amount of not more than 30 parts by weight, and preferably not more than 20 parts by weight, based on 100 parts by weight of the thermally curable resin copolymer (A) of the present invention. When the adhesion adjuvant (D) is used in the above range, film formability and storage stability are excellent.

The other additives (E) include components generally used for a coating solution, such as a surfactant, a thermal polymerization preventing agent, etc. The surfactant is exemplified by fluorine- or silicon-based surfactants. The thermal polymerization preventing agent is exemplified by hydroquinone, 4-methoxyphenol, quinone, pyrocatechol, t-butyl catechol, phenothiazine, etc. The additive (E) is preferably used in an amount of not more than 2 parts by weight, based on 100 parts by weight of the thermally curable resin copolymer (A). When the surfactant is used in the above composition range, the generation of excess bubbles may be prevented.

The solid content in the thermally curable resin composition may be appropriately selected depending on the purpose and process of forming the film, and is preferably 1~60 wt %, and more preferably 5~40 wt %, from the point of view of coatability.

The thermally curable resin composition of the present invention may be formed into a cured film using typical processes known in the art.

In this regard, according to an embodiment of this invention, a thermally curable resin composition solution is applied onto a substrate through an appropriate process, prebaked to remove a solvent so as to form a coating film, and then postbaked, thereby forming a cured film.

The coating process is not particularly limited, but includes spraying, roll coating, spin-coating, slit nozzle coating, etc. Preferably, a spin-coating process may be widely used. Occasionally, after the coating process, some residual solvent may be removed under reduced pressure before the prebaking process.

The conditions of prebaking and postbaking processes vary with the components and end uses of the composition. For example, a prebaking process may be typically conducted at 60~130° C. for 0.5~5 minutes, and a postbaking process may be carried out at 150~250° C. for a period of time from 10 minutes to 2 hours. Each of the prebaking and postbaking processes may be performed in at least one step. When the postbaking process of the present invention is conducted, the epoxy group of the copolymer reacts with the decomposed acid, therefore forming a cured film having a network structure.

The cured film thus formed is advantageous because it has excellent flatness, high surface hardness, superior heat resistance, and high chemical resistance, including acid resistance and alkali resistance, and thus may be usefully employed as a material for a protective film of a color filter for an LCD.

In addition, the present invention provides an LCD provided with a color filter including the protective film. The LCD is provided with a black matrix and a color filter and may be manufactured by typical processes known in the art.

A better understanding of the present invention may be obtained in light of the following examples, which are set forth to illustrate, but are not to be construed to limit the present invention. In the examples, the parts by weight are based on 100 parts by weight of a thermally curable copolymer.

Examples 1~8

Example 1

1-1. Thermally Curable Resin Copolymer 2-tetrahydropyranyl methacrylate - - - 25 parts by weight
glycidyl methacrylate - - - 45 parts by weight
γ-methacryloxypropyl trimethoxy silane - - - 30 parts by weight
propyleneglycol methylether acetate - - - 200 parts by weight Into a flask equipped with a nitrogen inlet, the monomers and solvent mentioned above were loaded. Subsequently, the temperature of the flask was increased to 90° C., and 3.0 parts by weight of azobisvaleronitrile (AVN) was added to the reaction mixture, and the temperature was maintained for 15 hours. The reacted resin solution was added in droplets to excess hexane to form a precipitate, which was then dried in a vacuum, thus obtaining a binder resin. This copolymer (A1) had a weight average molecular weight of 11,900 calculated using polystyrene as a standard. NMR data of the obtained copolymer is shown in FIG. 1.

1-2. Thermally Curable Resin Composition 100 parts by weight of the synthesized copolymer (A1) was dissolved in 400 parts by weight of 3-methoxybutyl acetate serving as a solvent (B), sufficiently stirred, and then filtered using a filter having a diameter of 0.2 μm, thus obtaining a curable composition (P 1).

1-3. Cured Film

The thermally curable resin composition prepared in Example 1-2 was applied onto a glass substrate using a spin-coating process, dried on a hot plate at 90° C. for 2 minutes, acting as a prebaking process, and then postbaked in a clean oven at 220° C. for about 30 minutes, thus forming a 1.5 μm thick cured film (F1).

1-4. Flattened Film

On a glass substrate, each of three color filters of red (R), green (G) and blue (B) was manufactured in a stripe shape to a line width of 100 μm using pigment-dispersion-type color resists (R, G, B). As a result of measuring the difference in height of the color filter using α-step (available from Tencor Corp.) as a contact-type surface profilometer, the difference between the greatest height and the lowest height was 0.9 μm. On the substrate on which the color filter was formed, a flattened film (F2) was formed in the same manner as the process of forming the cured film of Example 1-3.

Example 2

A copolymer (A2) having a weight average molecular weight of 11,500 calculated using polystyrene as a standard was prepared in the same manner as in Example 1-1, with the exception that 2-tetrahydropyranyl acrylate was used instead of 2-tetrahydropyranyl methacrylate. Then, using the copolymer thus prepared, a thermally curable resin composition, a cured film and a flattened film were prepared in the same manner as in Examples 1-2 to 1-4.

Example 3

A copolymer (A3) having a weight average molecular weight of 12,000 calculated using polystyrene as a standard was prepared in the same manner as in Example 1-1, with the exception that 3,4-epoxycyclohexyl methacrylate was used instead of glycidyl methacrylate. Then, using the copolymer thus prepared, a thermally curable resin composition, a cured film and a flattened film were prepared in the same manner as in Examples 1-2 to 1-4.

Example 4

A copolymer (A4) having a weight average molecular weight of 10,500 calculated using polystyrene as a standard was prepared in the same manner as in Example 1-1, with the exception that 20 parts by weight of 2-tetrahydropyranyl methacrylate, 50 parts by weight of glycidyl methacrylate, 15 parts by weight γ-methacryloxypropyl trimethoxy silane, and 15 parts by weight of styrene were used. The NMR data of the copolymer thus prepared is shown in FIG. 2. Then, using the above copolymer, a thermally curable resin composition, a cured film and a flattened film were prepared in the same manner as in Examples 1-2 to 1-4.

Example 5

A copolymer (A5) having a weight average molecular weight of 9,600 calculated using polystyrene as a standard was prepared in the same manner as in Example 1-1, with the exception that 15 parts by weight of 2-tetrahydropyranyl methacrylate, 30 parts by weight of glycidyl methacrylate, 30 parts by weight γ-methacryloxypropyl trimethoxy silane, and 25 parts by weight of styrene were used. The NMR data of the copolymer thus prepared is shown in FIG. 3. Then, using the above copolymer, a thermally curable resin composition, a cured film and a flattened film were prepared in the same manner as in Examples 1-2 to 1-4.

Example 6

A thermally curable resin composition was prepared in the same manner as in Example 1-2, with the exception that 30 parts by weight of dipentaerythritol hexaacrylate was additionally used as a polyfunctional monomer (C) having ethylenically unsaturated bonds. Then, a cured film and a flattened film were formed in the same manner as in Examples 1-3 and 1-4 using the composition thus prepared.

Example 7

A thermally curable resin composition was prepared in the same manner as in Example 1-2, with the exception that 5 parts by weight of γ-glycidoxypropyl trimethoxysilane was additionally used as an adhesion adjuvant (D). Then, a cured film and a flattened film were formed in the same manner as in Examples 1-3 and 1-4 using the composition thus prepared.

Example 8

A copolymer having a weight average molecular weight of 9,500, calculated using polystyrene as a standard, was prepared in the same manner as in Example 1-1, with the exception that 60 parts by weight of 2-tetrahydropyranyl methacrylate, 20 parts by weight of glycidyl methacrylate, and 20 parts by weight of γ-methacryloxypropyl trimethoxy silane were used. Then, using the copolymer thus prepared, a thermally curable resin composition, a cured film and a flattened film were prepared in the same manner as in Examples 1-2 to 1-4.

Comparative Examples 1~5

Comparative Example 1

20 parts by weight of methacrylic acid, 50 parts by weight of glycidyl methacrylate, 15 parts by weight of γ-methacryloxypropyl trimethoxy silane, and 15 parts by weight of styrene were used, and the same procedures as in Example 1-1 were conducted. However, 2 hours after polymerization was initiated with the addition of 3.0 parts by weight of azobisvaleronitrile (AVN), a gelling phenomenon occurred in a reactor.

Comparative Example 2

20 parts by weight of maleic anhydride, 50 parts by weight of glycidyl methacrylate, 15 parts by weight of γ-methacryloxypropyl trimethoxy silane and 15 parts by weight of styrene were used, and the same procedures as in Example 1-1 were conducted. However, 3 hours after polymerization was initiated with the addition of 3.0 parts by weight of azobisvaleronitrile (AVN), a gelling phenomenon occurred in a reactor.

Comparative Example 3

20 parts by weight of 2-tetrahydropyranyl methacrylate, 50 parts by weight of glycidyl methacrylate, 15 parts by weight of dicyclopentanyl methacrylate and 15 parts by weight of styrene were used, and the same procedures as in Example 1-1 were conducted, thus obtaining a copolymer having a weight average molecular weight of 10,000, calculated using polystyrene as a standard. Using the copolymer thus obtained, a thermally curable resin composition, a cured film, and a flattened film were formed in the same manner as in Examples 1-2 to 1-4.

Comparative Example 4

15 parts by weight of 2-tetrahydropyranyl methacrylate, 30 parts by weight of glycidyl methacrylate, 30 parts by weight of n-butyl methacrylate and 25 parts by weight of styrene were used, and the same procedures as in Example 1-1 were conducted, thus obtaining a copolymer having a weight average molecular weight of 9,700, calculated using polystyrene as a standard. Using the copolymer thus obtained, a thermally curable resin composition, a cured film, and a flattened film were formed in the same manner as in Examples 1-2 to 1-4.

Comparative Example 5

10 parts by weight of methacrylic acid, 45 parts by weight of glycidyl methacrylate, 15 parts by weight of γ-methacryloxypropyl trimethoxy silane and 30 parts by weight of styrene were used, and the same procedures as in Example 1-1 were conducted, thus obtaining a copolymer having a weight average molecular weight of 15,700 calculated using polystyrene as a standard. Using the copolymer thus obtained, a thermally curable resin composition, a cured film, and a flattened film were prepared in the same manner as in Examples 1-2 to 1-4.

Experimental Example 1

Assay of Cured Film

In order to assay the properties of the cured film obtained using the thermally curable resin composition of the present invention, the following experiments were conducted.

The cured film (F1) and flattened film (F2) prepared in each of Examples 1 to 8 were used. For comparison, the cured film (F1) and flattened film (F2) prepared in each of Comparative Examples 3 to 5 were used.

1-1. Adhesion

According to ASTM-D3359, the cured film (F1) was subjected to a pressure cooker test (120° C., humidity 100%, 4 hours), after which 100 checks were formed on the cured film (F1) using a cutting knife and then peeled using tape through a checker taping process. As such, the number of peeled checks among the 100 checks was counted, and adhesion was evaluated according to the following criteria.

○: when the number of peeled checks was 5 or less

Δ: when the number of peeled checks was 6~49

X: when the number of peeled checks was 50 or more

The composition prepared in each of Examples 1 to 8 had superior adhesion to compositions of Comparative Examples 3 to 5 (Table 1).

1-2. Surface Hardness

The hardness of the cured film (F1) was measured using a pencil according to ASTM-D3363. The results are given in Table 1 below.

All of the films had excellent surface hardness, with the exception of the films of Comparative Examples 1 and 2 (Table 1).

1-3. Transparency

The glass substrate having the cured film (F1) was exposed to light at 400 nm. The results are given in Table 1 below.

All of the films had excellent transparency, with the exception of the films of Comparative Examples 1 and 2 (Table 1).

1-4. Acid Resistance

The glass substrate having the flattened film (F2) was dipped into an aqueous solution of 5.0 wt % HCl at 30° C. for 30 minutes and then removed from the aqueous solution, after which the external appearance of the flattened film (F2) was observed to evaluate acid resistance. As such, no change in external appearance was judged as good (○), and an external appearance exhibiting a peeling phenomenon or a deterioration phenomenon to white was judged as poor (X). The results are given in Table 1 below.

All of the films had excellent acid resistance, with the exception of the films of Comparative Examples 1 and 2 (Table 1).

1-5. Alkali Resistance

The glass substrate having the flattened film (F2) was dipped into an aqueous solution of 5.0 wt % NaOH at 30° C. for 30 minutes and then removed from the aqueous solution, after which the external appearance of the flattened film (F2) was observed to assay alkali resistance. As such, no change in external appearance was judged as good (○), and an external appearance exhibiting a peeling phenomenon or a deterioration phenomenon to white was judged as poor (X). The results are given in Table 1 below.

As the result of alkali resistance of all of the cured films, with the exception of the films of Comparative Examples 1 and 2, although the cured film of Comparative Example 5 without the use of the monomer containing a 2-tetrahydropyranyl group as a latent curing agent had low alkali resistance, all of the cured films prepared using the monomer containing a 2-tetrahydropyranyl group had excellent alkali resistance (Table 1).

1-6. Solvent Resistance

The glass substrate having the flattened film (F2) was dipped into an NMP solution at 40° C. for 10 minutes, after which the change in thickness of the flattened film (F2) was observed to evaluate solvent resistance. As such, a change in thickness of not more than 3% was judged as good (○), and a change in thickness exceeding 3% was judged as poor (X). The results are given in Table 1 below.

The cured film of Comparative Example 5 without the use of the monomer containing a 2-tetrahydropyranyl group as a latent curing agent had low solvent resistance. In contrast, the cured films prepared in Examples 1 to 7 had excellent solvent resistance (Table 1).

1-7. Heat Resistance

After completion of a postbaking process, the cured film (F1) was additionally heat-treated in an oven at 250° C. for 1 hour. As such, the change in thickness of the film before and after the heat-treatment was measured. The results are given in Table 1 below.

The cured films prepared in Examples 1 to 7 had excellent heat resistance (Table 1).

1-8. Flatness

The difference between the greatest height and the lowest height of the flattened film (F2) was measured using α-step (available from Tencor Corp.) as a contact-type surface profilometer, and flatness was calculated using the following equation. The results are given in Table 1.

Flatness=[1−(difference in height of flattened film (F2)/difference in height of flattened film before application)]×100

1-9. Storage Stability

After the thermally curable resin composition (P1) was stored at room temperature for 2 weeks, variation of initial viscosity was measured. The results are given in Table 1 below.

The compositions prepared in Examples 1 to 8 had storage stability superior to the composition of Comparative Example 5 without the use of the monomer containing a 2-tetrahydropyranyl group as the latent curing agent (Table 1).

TABLE 1

| No. | Adhesion | Surface Hard. | Transparency | Acid Resistance | Alkali Resistance | Solvent Resistance | Heat Resistance | Flatness | Storage Stability |
|---|---|---|---|---|---|---|---|---|---|
| Ex.1 | ○ | 4H | >98% | ○ | ○ | ○ | 99% | 70% | <5% |
| Ex.2 | ○ | 4H | >98% | ○ | ○ | ○ | 99% | 71% | <5% |
| Ex.3 | ○ | 4H | >98% | ○ | ○ | ○ | 97% | 72% | <5% |
| Ex.4 | ○ | 4H | >98% | ○ | ○ | ○ | 99% | 68% | <5% |
| Ex.5 | ○ | 4H | >98% | ○ | ○ | ○ | 99% | 75% | <5% |
| Ex.6 | ○ | 4H | >98% | ○ | ○ | ○ | 97% | 77% | <5% |
| Ex.7 | ○ | 4H | >98% | ○ | ○ | ○ | 99% | 75% | <5% |
| Ex.8 | Δ | 3~4H | >98% | ○ | ○ | X | 91% | 61% | <5% |
| C.Ex.1 | — | — | — | — | — | — | — | — | — |
| C.Ex.2 | — | — | — | — | — | — | — | — | — |
| C.Ex.3 | X | 4H | >98% | ○ | ○ | ○ | 99% | 68% | <5% |
| C.Ex.4 | X | 4H | >98% | ○ | ○ | ○ | 99% | 71% | <5% |
| C.Ex.5 | X | 4H | >98% | ○ | X | X | 98% | 70% | Gelling |

INDUSTRIAL APPLICABILITY

In the thermally curable resin composition of the present invention, a latent curable monomer, which causes an epoxy group to cure due to an acid produced via thermal decomposition upon postbaking at 150° C. or more, is used, thereby synthesizing copolymers having various composition ratios and exhibiting excellent storage stability. Moreover, along with the latent curable monomer, an ethylenically unsaturated monomer containing a reactive silyl group is further used, thereby exhibiting high adhesion.

The invention claimed is:

1. A thermally curable resin copolymer, composed mainly of:

a first ethylenically unsaturated monomer, which produces an acid via decomposition at 150° C. or more, wherein the first ethylenically unsaturated monomer is a monomer containing a 2-tetrahydropyranyl group represented by Formula 1 below:

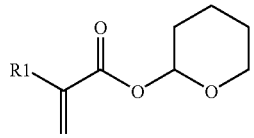

wherein R1 is a hydrogen atom or an alkyl group having 1 to 6 carbons;

a second ethylenically unsaturated monomer containing an epoxy group copolymerizable with the first ethylenically unsaturated monomer; and a third ethylenically unsaturated monomer having a reactive silyl group.

2. The thermally curable resin copolymer according to claim 1, wherein the first ethylenically unsaturated monomer is decomposed at 150~250° C., thus producing an acid.

3. The thermally curable resin copolymer according to claim 1, wherein the monomer containing a 2-tetrahydropyranyl group is 2-tetrahydropyranyl methacrylate or 2-tetrahydropyranyl acrylate.

4. The thermally curable resin copolymer according to claim 1, wherein the first ethylenically unsaturated monomer is used in an amount of 5~50 parts by weight, based on 100 parts by weight of the thermally curable resin copolymer.

5. The thermally curable resin copolymer according to claim 1, wherein the second ethylenically unsaturated monomer containing an epoxy group is at least one selected from the group consisting of an aliphatic epoxy-containing unsaturated compound, an alicyclic epoxy-containing unsaturated compound, and an aromatic epoxy-containing unsaturated compound.

6. The thermally curable resin copolymer according to claim 1, wherein the second ethylenically unsaturated monomer containing an epoxy group is used in an amount of 10~90 parts by weight, based on 100 parts by weight of the thermally curable resin copolymer.

7. The thermally curable resin copolymer according to claim 1, wherein the third ethylenically unsaturated monomer having a reactive silyl group is selected from the group consisting of vinyltrialkoxysilane, vinyltris(β-methoxyethoxy) silane, methylvinyldimethoxysilane, and (meth)acryloxysilane.

8. The thermally curable resin copolymer according to claim 7, wherein the (meth)acryloxysilane is .beta.-(meth) acryloxyethyltrimethoxysilane, β-(meth)acryloxyethyltriethoxysilane, γ-(meth)acryloxypropyltrimethoxysilane, γ-(meth)acryloxypropyltriethoxysilane, γ-(meth)acryloxypropylmethyl dimethoxysilane, γ-(meth)acryloxypropyldimethylmethoxysilane, γ-(meth)acryloxypropylmethyldiethoxysilane, and γ-(meth)acryloxypropyl dimethylethoxysilane.

9. The thermally curable resin copolymer according to claim 1, wherein the third ethylenically unsaturated monomer having a reactive silyl group is used in an amount of 5~60 parts by weight, based on 100 parts by weight of the thermally curable resin copolymer.

10. The thermally curable resin copolymer according to claim 1, further comprising at least one polymerizable monomer selected from the group consisting of aliphatic or aromatic (meth)acrylate; caprolactone modified (meth)acrylate; an acrylate monomer having a hydroxyl group; a styrene monomer; 1,3-butadiene; and isoprene.

11. The thermally curable resin copolymer according to claim 1, wherein the thermally curable resin copolymer has a weight average molecular weight from 2,000 to 100,000.

12. A thermally curable resin composition, comprising the thermally curable resin copolymer of claim 1 and a solvent.

13. The thermally curable resin composition according to claim 12, further comprising at least one additive selected from the group consisting of a polyfunctional monomer having ethylenically unsaturated bonds, an adhesion adjuvant, a surfactant, and a thermal polymerization preventing agent.

14. The thermally curable resin composition according to claim 13, wherein the adhesion adjuvant is a silane compound.

15. A cured film, formed using the thermally curable resin composition of claim 12.

16. A color filter for a liquid crystal display, comprising a cured film formed using the thermally curable resin composition of claim 11.

17. The color filter according to claim 16, wherein the cured film is a protective film.

18. A liquid crystal display, provided with the color filter of claim 17.

* * * * *